United States Patent [19]

Straub

[11] 4,142,544
[45] Mar. 6, 1979

[54] SAFETY ELEMENT FOR CLOSING A LINE FROM A PRESSURE VESSEL

[75] Inventor: Hermann Straub, Winterthur, Switzerland

[73] Assignee: Sulzer Brothers Limited, Winterthur, Switzerland

[21] Appl. No.: 784,841

[22] Filed: Apr. 5, 1977

[30] Foreign Application Priority Data

Apr. 9, 1976 [CH] Switzerland ............... 4516/76

[51] Int. Cl.² .................. F16K 13/04; F16K 17/40
[52] U.S. Cl. ............................. 137/67; 137/460; 137/498; 137/517
[58] Field of Search ............... 137/67, 73, 74, 460, 137/498, 499, 501, 503, 504, 517, 590; 138/45; 251/4

[56] References Cited

U.S. PATENT DOCUMENTS

| | | | |
|---|---|---|---|
| 2,593,420 | 4/1952 | Diehl | 138/45 X |
| 2,661,764 | 12/1953 | Johnson et al. | 137/517 |
| 2,818,089 | 12/1957 | Mayhill | 137/849 X |
| 3,254,869 | 6/1966 | Easey | 251/340 X |
| 3,301,142 | 1/1967 | Cenko | 137/517 X |
| 3,556,142 | 1/1971 | Sabin et al. | 137/517 X |
| 3,895,646 | 7/1975 | Howat | 137/849 X |

*Primary Examiner*—William R. Cline
*Attorney, Agent, or Firm*—Kenyon & Kenyon, Reilly, Carr & Chapin

[57] ABSTRACT

The safety element is disposed at the end of a line which communicates with a pressure vessel. The safety element allows flow from the line into the pressure vessel. Upon an abrupt decrease in pressure in the line caused, for example, by a fracture, the safety element collapses so as to close off the line to the pressure vessel. The safety element is constructed as either a folded cone or as a rigid plate with plastically deformable members securing the plate to a line.

12 Claims, 7 Drawing Figures

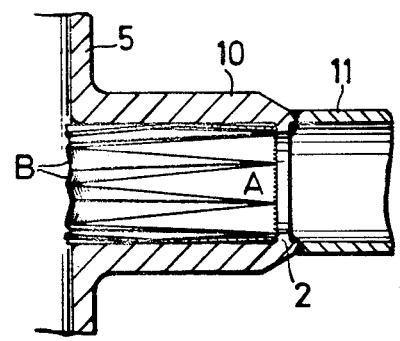
FIG. 3
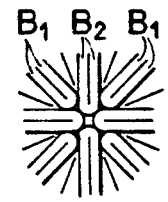
FIG. 7
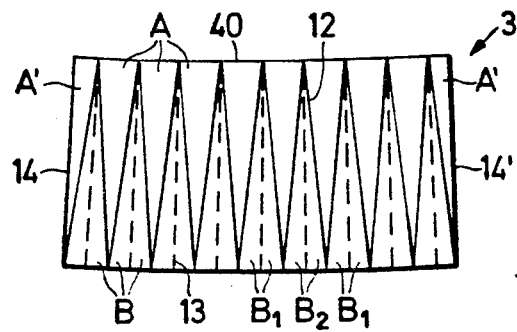
FIG. 4
FIG. 5
FIG. 6
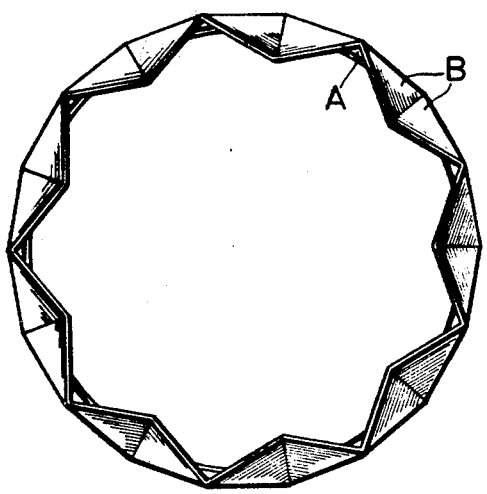
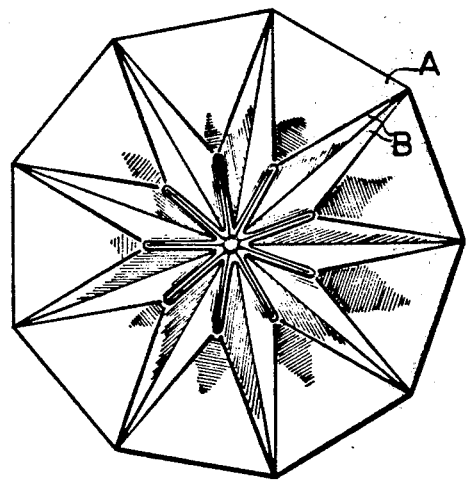

SAFETY ELEMENT FOR CLOSING A LINE FROM A PRESSURE VESSEL

This invention relates to a safety element. More particularly, this invention relates to a safety element for closing a pipe line to a pressure vessel.

As is known, in many branches of technology, particularly in process or reactor installations, it is often necessary for safety reasons to have one or more lines leaving or entering a pressure vessel constructed such that the vessel cannot empty suddenly if a line fractures. To this end, it has been known to dispose a valve near the place where the line is connected to the pressure vessel, for example as described in German Auslegeschrift No. 2,424,427. However, the efficacy of these valves may be reduced over a period of time due to the accumulation of deposits and/or by the formation of corrosion products at the locations where they are mounted or where they rotate. The efficacy of these valves is particularly reduced if the valves are not used for a long time. This is a distinct disadvantage in safety systems.

Accordingly, it is an object of the invention to provide a safety element for closing a line connected to a pressure vessel which does not rely upon movable mechanical parts.

It is another object of the invention to close a line to a pressure vessel without relying upon a valve.

It is another object of the invention to provide a safety element of simplified construction for shutting off lines to a pressure vessel.

It is another object of the invention to provide a safety element which is not restricted in movement by corrosion or deposits.

Briefly, the invention provides a safety element of collapsible construction for closing off a line to a pressure vessel in order to prevent an abrupt outflow of stored medium from the pressure vessel. To this end, the safety element includes a closure element which is characterized as being deformable in response to an abrupt pressure drop in the line in order to close the line to the vessel interior.

In one embodiment, the closure element is in the form of a foldable element which is disposed in the line and bears axially on an inwardly projecting wall of the line. In addition, the foldable element has pockets which open into the vessel interior. Should a differential pressure occur between the pockets which are in communication with the interior of the pressure vessel and the interior of the foldable element which is in communication with the line, the element will collapse to close the line. When in an open state, this closure element causes only a relatively small pressure loss in the flow.

The safety element, thus, does not rely upon any sliding parts, the movement of which might be restricted or made impossible by corrosion or deposits, in order to close a line. On the contrary, the safety elements are themselves deformable so as to close the line. Further, because there are no sliding parts, the safety element does not need to be periodically tested for efficiency. Still further, the safety element is very easy and inexpensive to manufacture.

Advantageously, the part of the line which carries the safety element projects into the pressure vessel.

These and other objects and advantages of the invention will become more apparent from the following detailed description and appended claims taken in conjunction with the accompanying drawings in which:

FIG. 3 illustrates a part-cross-sectional view of a safety element according to the invention in a modified pressure vessel;

FIG. 4 illustrates a development of the safety element of FIG. 1;

FIG. 5 illustrates an end view of the safety element of FIG. 1;

FIG. 6 illustrates an end view of the safety element of FIG. 1 after collapse; and FIG. 7 illustrates an end view of a collapsed modified safety element.

Figure 2:
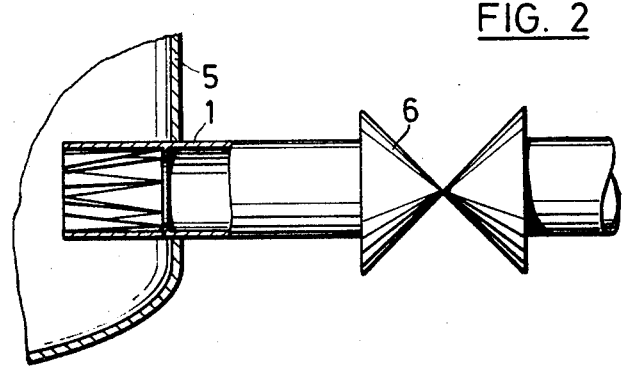
FIG. 2 illustrates a part-sectional view of a safety element installed in a line to a pressure vessel.

Referring to FIG. 2, the safety element 3 is disposed in the end of a line such as a pipe line or other conduit 1 leading into a pressure container or vessel 5 containing a medium under pressure. The line 1 extends from the pressure vessel 5 and contains a shut-off means 6 of known construction at a short distance from the vessel 5.

Figure 1:
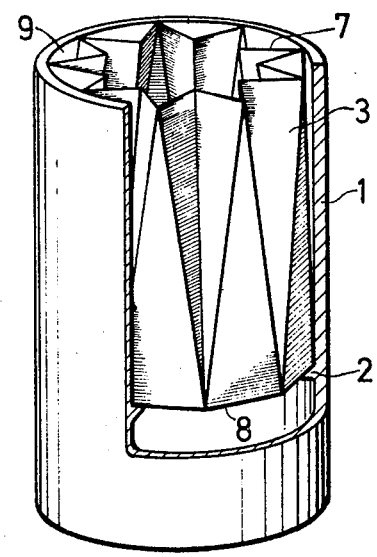
FIG. 1 illustrates a perspective view, partly in section, of a safety element in accordance with the invention.

Referring to FIG. 1, the line 1 includes an inwardly directed radial wall 2 against which the safety element 3 abuts. The safety element 3 comprises a folded or pleated tubular closure element which defines a flow path therethrough and is comprised of a cone, e.g. of thin sheet metal, peripherally folded to form a star-shaped cross-section having n points at one end 7 and a regular n sided polygonal cross-section at the opposite end 8. The safety element 3 is so shaped that the folds form pyramidal pockets 9 which open into the interior of the vessel 5. The circles which inscribe the safety element 3 at both ends 7, 8 each have a diameter which corresponds to the inner diameter of the line 1 such that the safety element 3 is tightly fitted in the line 1. As shown in FIG. 1, the radial wall 2 is of a projecting width such that the segment type gaps between the end 8 of the safety element 3 and the inner wall of the line 1 are covered. Further, the angles formed by the sides of the polygonal end 8 of the element 3 are displaced in the circumferential direction relative to the points at the other end 7.

As shown in FIG. 2, the line 1 extends into the pressure vessel 5 so that the wall 2 is in the neighborhood of or inside the vessel wall.

The safety element is characterized in being collapsible under a predetermined differential pressure existing between the pockets 9 and the interior of the cone. Thus, if, as a result of an accident, the line 1 between the valve 6 and the pressure vessel 5 fractures, the pressure on the inside of the safety element 3 falls abruptly to the pressure outside the line 1. However, the pressure within the pyramidal pockets 9 between the safety element 3 and the interior surface of the line 1 remains substantially at the same pressure as in the pressure vessel 5. As a result of the pressure differential, the safety element 3 collapses such that the star-shaped end 7 closes in a substantially seal-tight manner so as to close off the flow path through the element 3 and, thus, the line 1 from the interior of the pressure vessel 5.

The invention thus provides a safety element of relatively simple construction which does not require sliding parts. The safety element is constructed such as to permit a flow therethrough at normal speed in both directions without the closure member moving, i.e. the pressure drop is very small in both directions. If, however, the safety element is placed in operation as a result of a pipe fracture, the element remains closed as a result of the plastic deformation, even if the pressure differential disappears.

Referring to FIG. 3, the safety element 3 may alternatively be nearly fully enclosed in a thick-walled branch 10 of the vessel 5. In this case, a tube 11 is connected by welding to the branch 10.

This arrangement has the advantages that the vessel 5 is free from inserts and that the element 3 forms a thermo sleeve which protects the branch zone from sharp temperature differences and heat stresses.

FIG. 4 shows the development of the element 3, used in FIGS. 1 and 5, which is produced by folding a thin plate. The folds form 9 small isosceles first triangles A, and 18 small second triangles B, one triangle A' is divided into two halves with edges 14 and 14' respectively. Along the full lines 12 there are concave folds and along the dotted lines 13 convex folds are made. After folding, the edges 14 and 14' are welded together, the element is pushed into the branch and the small bases 40 of the triangles A are welded to the ring 2 (FIGS. 1 and 3).

FIG. 5 shows an axial view of the element 3 in the original state, as built in. The top of the triangles A are abutting on the inside wall of the branch 10 (not shown). The full pressure of the vessel 5 acts in the pockets formed by the triangles B and inside wall of the branch, whereas the pressure is reduced according to the throughflow inside the element 3. The element 3 resists that normal pressure difference. However, if the throughflow augments strongly, i.e. if the throughflow pressure drops abruptly for instance because of the rupture of the tube 11, the element 3 collapses to the state as shown in FIG. 6.

In this state the triangles B are turned to nearly radial directions, so that they form strong riblike supports for the triangles A, which are loaded by the high pressure difference charging them.

On the other side the triangles A support one of the long sides of the adjacent triangles B; the common long sides of the adjacent triangles B then support one another reciprocally.

The full axial thrust is carried by the ring 2.

Experiments have shown, that—when folded in an exact manner — the short bases of the triangles B collapse relatively tightly together, forming a liplike seal, the leakage of which becomes smaller the higher the acting pressure difference is.

In order to stiffen the triangles A they can be, preferably after the folding procedure, cylindrically or conically shaped, for instance in such a manner that — when inserted into the branch — they touch the inside wall of branch 10 with a great part of their outer surface.

By folding the element 3 according to FIG. 4 the plate is hardened by cold working in the region of the folds with the effect that the lips do not close tightly in the corners of the mouths and in the center region. This phenomenon can be reduced by a softening by heat treatment of the element 3 after folding of the element 3.

In order to obtain a smaller center leak, the length of the small bases of consecutive pairs of adjacent triangles $B_1$ and $B_2$ respectively can be slightly alternated to obtain an arrangement in folded state as shown enlarged in FIG. 7.

What is claimed is:

1. The combination comprising a pressure vessel for storing a medium in an interior thereof under pressure;

a line connected to said pressure vessel in communication with said interior; and a safety element for closing said line to said vessel interior in response to a fracture in said line to prevent an abrupt outflow of the stored medium into said line, said safety element including a tubular closure element defining a flow path therethrough and being peripherally folded to form a star-shaped cross-section at one end and a regular polygonal cross-section at an opposite end, said element being deformable in response to a pressure drop in said line to close said line to said vessel interior.

2. The combination as set forth in claim 1 wherein said closure element is disposed at an end of said line and bears axially on an inwardly projecting wall of said line, said element having folds forming pockets between said ends and opening into said vessel interior.

3. The combination as set forth in claim 1 wherein said line projects into said vessel interior with said safety element disposed within said line and said vessel.

4. The combination comprising a pressure vessel for storing a medium in an interior thereof under pressure;

a line to said pressure vessel in communication with said interior; and a peripherally folded tubular element disposed at an end of said line to define a flow path therethrough, said element being folded to form a star-shaped cross-section at one end, a regular polygonal cross-section at an opposite end and a plurality of folds forming pyramidal pockets on the exterior thereof and opening to said vessel interior, said folded element being collapsible under a differential pressure between said pockets and the interior of said element to close said flow path said line to in said vessel interior.

5. The combination as set forth in claim 4 wherein said line includes an inwardly directed radial wall and said folded element abuts said wall at said opposite end.

6. The combination as set forth in claim 5 wherein said wall and said folded element are located within said vessel.

7. The combination as set forth in claim 4 wherein said folded element comprises a plurality of isosceles first triangles with long equal legs relative to their bases, said triangles being connected on their bases and at each of their long legs alternating with pairs of small second triangles which have a common long side; the tops of the pairs of said second triangles being placed at the bases of said first triangles and the tops of said first triangles being placed between the bases of adjacent pairs of second triangles.

8. The combination as set forth in claim 7 wherein the bases of each said pair of second triangles have slightly different length relative to the bases of the adjoining pairs of second triangles.

9. The combination as set forth in claim 4 wherein said vessel has a branch extending therefrom and connected to said line, said safety element being disposed in said branch.

10. A tubular safety element for closing a line connected to a pressurized vessel, said element defining a flow path therethrough and being peripherally folded to form a star-shaped cross-section at one end, a regular polygonal cross-section at an opposite end and a plurality of folds forming pyramidal pockets on the exterior thereof, said folded element being collapsible under a predetermined differential pressure between said pockets and the interior of said element.

11. A safety element as set forth in claim 10 wherein said element is made of thin sheet metal.

12. A safety element as set forth in claim 10 wherein said one end has n-points and said opposite end has n-sides defining angles displaced in the circumferential direction relative to said points at said one end.

* * * * *